Patented Jan. 11, 1949

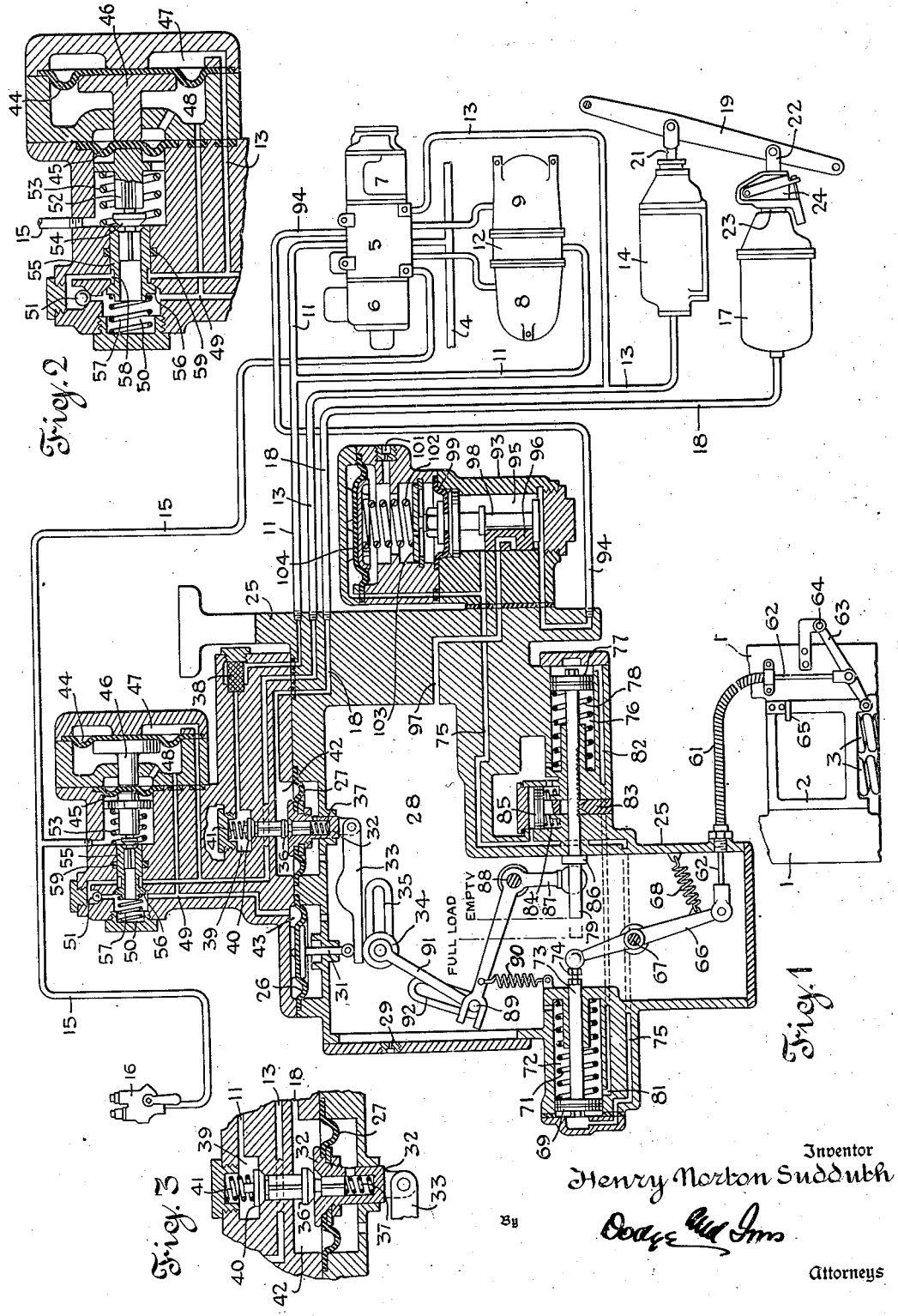

2,458,965

UNITED STATES PATENT OFFICE 2,458,965

VARIABLE LOAD BRAKE

Henry Norton Sudduth, Watertown, N. Y., assignor to The New York Air Brake Company, a corporation of New Jersey Application November 25, 1944, Serial No. 565,130

8 Claims. (Cl. 303—22)

This invention relates to air brakes and particularly to freight brakes of the variable load type.

Present trends indicate that, in the not distant future, freight cars will be of materially lighter construction without reduction in the loads to be carried by the cars. In consequence the ratio of loaded weight to light weight will be increased beyond the limit permissible with the present AB brake equipment.

The type of car and type of load to be carried is such that partial loading must be compensated for, so that some form of variable load brake must be adopted. Since the AB brake valve will remain standard for all freight cars used in interchange service, any variable load brake to be acceptable for general adoption must use the AB valve. Moreover it must preserve the basic operating characteristics of that valve, since cars equipped with the proposed variable load brake must operate in trains which will include old cars having standard AB brake equipment. These facts impose severe limitations, and create a difficult problem.

It has heretofore been proposed to construct a variable load brake in which use is made of a brake cylinder (hereinafter called the "light" cylinder) which is adequate to perform braking functions on an unloaded car, and with which is used a second brake cylinder (hereinafter called the "load" cylinder), which is brought into action on loaded cars only after the light cylinder has brought the brake shoes into frictional contact with the wheels. The load cylinder is then latched to the brake rigging, and being designed with a minimum piston clearance is put under pressure with the minimum practicable expenditure of air.

The admission of air to the load brake cylinder is controlled by a variable ratio relay which is piloted by the braking pressure in the light cylinder and develops a proportional pressure in the load cylinder. The ratio of such proportional pressure to the pressure in the light cylinder is determined by a lever mechanism forming part of the relay and having a shiftable fulcrum. This fulcrum is positioned according to the load on the car.

Some features of the present invention could be used with any of various known mechanisms suitable to position the fulcrum in relation to the load on the car. It is desirable to use a mechanism which performs this fulcrum adjusting function during the initial phase of charging of the brake pipe on the car.

Mechanisms of this general type as heretofore known have not been entirely satisfactory for a number of reasons. They assumed a loaded car adjustment in the event of mal-function, whereas safety would be better served by a device which always assumes a light car position unless it functions correctly. Moreover no load sensing mechanism heretofore proposed adjusts the proportioning action of the relay in even approximately correct relation to the load on the car.

The embodiment here illustrated gives very nearly precise proportioning adjustment, attains it by a very simple mechanism, and tends to assume no-load setting unless it functions as intended.

Another objection to prior art devices was that during cycling in grade work with retainers set, the load brake cylinder was exhausted during release operations. In consequence much air was wasted.

According to the present invention the load cylinder and the light cylinder are both subjected to control by the retainer and controlled in such a way that they function harmoniously during cycling with retainers set.

Thus the invention offers a number of very important refinements but takes advantage of certain known principles to carry out some of its functions.

The invention will now be described with reference to the accompanying drawing in which:

Figure 1 is a diagrammatic section of the load controlling mechanism drawn on as large a scale as conditions permit and shown connected to the brake cylinders, reservoirs, AB valve and retainer, all drawn in miniature.

Figure 2 is an enlarged view of the pilot valve.

Figure 3 is an enlarged view of the valve portion of the relay.

The drawing shows a workable embodiment, but is diagrammatic to the extent that all ports are shown in a single plane. More compact commercial arrangements can readily be designed according to well known principles.

The drawing shows the system uncharged and under "no load" conditions.

Since the car truck and the AB brake valve are basic elements to which the invention is applied, these will be described first to develop the environment in which the invention will be used.

Pedestals of a conventional car truck are illustrated at 1 and the truck bolster at 2. Springs 3 support the bolster on the truck. The bolster is shown at its uppermost (unloaded) position from which load on the car will depress it relatively to the pedestals. Thus its depression downward from the illustrated position is a function of the load imposed on the car.

The brake pipe of an automatic air brake system extends from end to end of the car. Such brake pipes are connected from car to car by the usual angle cocks and coupled hose and charging and venting of the brake pipe are controlled by the usual engineers brake valve on the propelling unit. In the drawing only a fragment 4 of the brake pipe is illustrated, since its connections and control follow standard practice.

The brake pipe 4 is connected to the pipe bracket 5 on which are mounted the emergency portion 6 and service portion 7 of the AB brake valve. Piped individually to bracket 5 are the emergency reservoir 8 and the auxiliary reservoir 9. From bracket 5 a branched pipe 11 leads to a supplemental reservoir 12 and to the variable load mechanism. A supplemental reservoir 12 is not used with the regular AB brake valve, but is here provided to furnish air to the load cylinder. It is charged directly from brake pipe 4 through a check valve and a flow-restricting choke which are not shown but would desirably be mounted in bracket 5. It is known practice so to charge a supplemental reservoir where one is needed to actuate a load brake cylinder. Consequently illustration of the path for charging the supplemental reservoir 12 is deemed unnecessary.

The usual brake cylinder pipe 13 leads to the light brake cylinder 14 and has a branch leading to the variable load mechanism to be described. The retainer pipe 15 leads to the usual retainer 16 and has a branch leading to the variable load mechanism.

The above named components except the parts 14 and 12 and the connections to the variable load mechanism are standard AB valve and freight car equipment. To these are added a load sensing mechanism and a variable load relay valve which controls the load cylinder.

The variable load mechanism controls admission and exhaust of motive air to and from the load brake cylinder 17 by way of load cylinder pipe and passage 18. The piston in light cylinder 14 operates lever 19 through the usual push-rod 21. Cylinder 14 always operates in advance of load cylinder 17 and so causes lever 19 to draw push-rod 22 outward relatively to the still retracted tubular piston rod 23 of cylinder 17. The distance moved depends on the running slack. When load cylinder 17 is operated latch 24 clutches piston rod 23 to push-rod 22. The clutch is of a type which disengages only when piston rod 23 retreats to its full release (innermost) position.

The cylinder and latch arrangement is in daily use in light and load brakes, and since its functions are familiar, requires no detailed description.

The variable load mechanism is enclosed in a housing generally indicated at 25 and made up of castings having the necessary ports and passages hereinafter described. Pipes and passages which are in free communication with one another are designated by the same reference numeral in order to minimize the use of reference numerals on the drawing and simplify the description.

The relay proper comprises two movable abutments, shown as flexible diaphragms 26 and 27 of equal areas. These are clamped at their margins between separable portions of the housing as shown. Each is subject on its lower face to atmospheric pressure, the spaces below the diaphragms being open to the chamber 28 which is vented to atmosphere at 29. The chamber 43 above diaphragm 26 is subject at certain times to pressure developed in the light brake cylinder 14. It reacts downward on the enlarged head of the vertically guided thrust member 31. The diaphragm 27 carries at its center a ported hub 32. The lower end of the hub 32 is pinned to the righthand end of a lever 33, the other end of which is in thrust engagement with a thrust roller on the lower end of the thrust member 31. The lever 33 has a shiftable fulcrum which takes the form of a roller 34 whose journal is guided horizontally by a fixed guide slot 35. The port through hub 32 is controlled by a poppet type exhaust valve 36 which is biased in an opening direction (upward) by a coil compression spring 37 mounted in the hub beneath it.

The pipe 11 already described as connected to the supplemental reservoir 12 leads through a strainer 38 to a chamber 39 in the body 25. A poppet inlet valve 40 which opens toward the chamber 39 is biased in a closing direction by an overlying coil compression spring 41 as shown and has a downward extending pilot which is aligned with and arranged to enter into thrust engagement with the exhaust valve 36. The parts are so arranged that if the diaphragm 27 is forced upward, the effect is first to seat the exhaust valve 36 and then unseat the inlet or supply valve 40 admitting air from the supplemental reservoir 12 to the space 42 above the diaphragm. The space 42 is connected by the passage and communicating pipe 18 with the load cylinder 17.

During brake applications and after a definite pressure has been developed in the light cylinder 14, the pressure acting in the light cylinder 14 is permitted to act in the space 43 above the diaphragm 26. This action is timed and controlled by a pilot valve mechanism best shown in Figure 2. This comprises a differential pair of diaphragms, namely a large diaphragm 44 and a smaller diaphragm 45 reacting upon one another at their centers in one-way thrust through a stem 46 which is guided to move longitudinally. The space 47 to the right of the large diaphragm 44 is in free communication with the pipe 13 and consequently with the light cylinder 14. The space 48 between the two diaphragms is connected by a branched passage 49 with the chamber 43 above diaphragm 26 and with a valve chamber 50. A by-pass check valve 51 permits flow from chamber 50 to passage 13.

A spider 52 is biased to the right as viewed in the drawing by a coil compression spring 53 and is in thrust engagement with diaphragm 45 and stem 46. It carries on its end a release valve 54 of the poppet type. The valve 54 controls a seat formed in the end of a tubular stem 55 of a poppet valve 56 which opens when moved in a lefthand direction and which is biased closed by a coil compression spring 57. The pilot of valve 54 is guided in the bore of the stem 55. There is an annular groove 58 which encircles the tubular stem and which is in communication at all times with the brake cylinder passage 13. There is packing 59 around stem 55 to the right of groove 58.

The space to the left of the diaphragm 45, in which the spring 53 and spider 52 are mounted, is in free communication with the retainer pipe 15.

With the parts in the release position shown in the drawing the spring 53 holds the diaphragms 44 and 45 to the right so that the exhaust valve 54 is open and so that the valve 56 is closed by a spring 57. Consequently chamber 43 above diaphragm 26 is disconnected from the light brake cylinder 14 and is connected to the retainer pipe. Hence it is connected freely to atmosphere if the retainer 16 is not set, and is controlled by the retainer when the latter is set.

The diaphragms 44 and 45 are of such areas and the springs 53 and 57 are of such strengths that if a pressure is developed in the light brake cylinder 14 sufficient to bring the brake shoes against the wheels, the spring 53 will be overpowered and the valve 54 will be closed. For this a brake cylinder pressure of approximately 8 lbs. will be assumed. An increase in pressure in the cylinder 14 to say 13 lbs. will overpower also the spring 57 and open the valve 56 connecting the light brake cylinder 14 with the space 43 above the diaphragm 26.

It will be observed that any pressure which is developed in the passage 49 will be admitted to the space 48 between the two diaphragms 44 and 45. The areas of the diaphragms are so chosen that as a brake application is increased in intensity the pressures in the two brake cylinders 14 and 17 tend to become equal at full service (i. e. at "full equalization"). In other words when light brake cylinder pressure corresponds to full equalization, that is approximately 50 lbs., the pressures in spaces 47 and 48 become approximately equal. In consequence the diaphragm 44 becomes ineffective. The area of the diaphragm 45 is such that it can just hold the valve 54 closed against the reaction of spring 53 when 50 lbs. pressure exists in the space 48. An increase of pressure above 50 lbs. in the space between the two diaphragms such as would occur during emergency applications, will cause the diaphragm 45 to move to the left and hold the valve 56 open.

Since American railway cars are mounted on bogie trucks and since the spring suspension is in the trucks, a flexible connection is needed between a load sensing component on the truck and the fulcrum adjusting mechanism on the body. According to the invention this connection takes the form of a "Bowden wire," and is so contrived that the wire acts in tension. This last is desirable, but not strictly necessary, since a Bowden wire can be made to operate in compression.

An important feature (here illustrated but not the invention of this applicant) is an arrangement such that the Bowden wire is inert except during the load sensing operation. This greatly reduces wear.

A flexible tubular casing 61 is attached at one end to housing 25 and at the other end to a pedestal 1. It houses a flexible push-pull wire 62. The lower end of wire 62 is pinned to a feeler lever 63 pivoted at 64 in the pedestal, and capable of being drawn up until it engages a lug 65 on bolster 2. The distance it can be so drawn up diminishes as the load on the car is increased.

The upper end of wire 62 is pinned to a lever 66 which is fulcrumed near its middle on a journal 67 carried by housing 25. The wire is biased to the position shown by a tension spring 68, which is located in housing 25 rather than on pedestal 1 simply to protect it against damage.

A single acting piston 69 with return spring 71 in cylinder 72 operates a push-rod 73. This carries an adjustable head 74 which engages the upper end of lever 66 and forces it out as far as lug 65 permits. This action occurs when port 75 is put under pressure by means to be described.

Axially aligned with cylinder 72 is a somewhat smaller cylinder 76 in which a piston 77 may be forced out against a return spring 78 until the end of its rod 79 engages the end of lever 66. Air to actuate piston 77 is delivered through a side port 81 in cylinder 72 to a passage 82 which leads to the head end of cylinder 76. This assures that piston 69 must move at least a short distance before piston 77 can be energized. This is idle motion of piston 69 necessary to reach full-load position. It times the pistons so that piston 69 moves before piston 77 moves, and serves as a safeguard in the event that piston 69, or the cable 62, or related parts should fair to function. In such case piston 77 will retreat to no-load position when unlatched by the latch described below.

Rod 79 is toothed and may be locked by a latch 83 held normally engaged by spring 84 and releasable by piston 85 which is subject to pressure in passage 75.

A collar 86 on rod 79 engages one forked end of bell crank 87 which is mounted on journal pin 88 carried by housing 25. The bell crank lever 87 is biased to turn counterclockwise (as viewed in Fig. 1) by a tension spring 90. The other forked end of bell crank 87 engages a pin 89 on the lower end of link 91 connected to the journal of roller 34. The pin 89 works in a guide slot 92 in housing 25.

The use of a link 91 with its ends guided by slots 92 and 35 arranged as shown has the effect of making the force ratio of the relay vary nearly in strict proportion to the displacement of piston 77 which is in turn substantially proportional to the load on the car. This linkage is the invention of another and hence is not claimed in the present application. Where less precise proportioning is sufficient, other connections between piston 77 and roller 34 may be used.

It should be observed that the ratio controlling means (roller 34), has a positive connection with bell crank 87, and is biased toward low ratio position by spring 90. This spring holds bell crank 87 in thrust engagement with collar 86 on rod 79 of piston 77, so that the bell crank and piston move together. The spring 78 prevents the piston from unduly loading spring 90, but is not ordinarily effective to move the piston independently of the bell crank.

To develop pressure in port 75 and then vent that port during initial charging of brake pipe 4, use is made of a cutoff valve which is the mechanism enclosed in housing 93.

A pipe 94 which is simply a branch of brake pipe 4, leads from bracket 5 to valve chamber 95 in housing 93. In chamber 95 is a seat for slide valve 96.

The end of passage 75 is exposed in this seat as is the end of an exhaust passage 97. The slide valve has a cavity as shown and is so dimensioned that in its lower position it exposes passage 75 and blanks exhaust passage 97, while in its upper position it connects passages 75 and 97.

Valve 96 is shifted by stem 98 attached to the center of flexible diaphragm 99 which is subject on its upper side to atmospheric pressure (see port 101) and on its lower side to pressure in chamber 95. The diaphragm 99 is biased downward by coil compression spring 102 which reacts through a shiftable plate 103. The stress on spring 102 is increased when port 75 is under pressure by a diaphragm 104 which serves as a spring seat and is subject to pressure in passage 75 acting on its upper side.

Operation

Assume that the brake pipe 4 is completely vented. There are several circumstances under which this would be the case, and under these conditions the train would be at rest, either as the result of an emergency application (since these are not released until the train stops) or because the car was cut out for switching operations. It is immaterial whether the reservoirs 8, 9 and 12 are or are not partially charged, and it is immaterial what the position of the fulcrum 34 may be at the time.

Assume that, starting with the brake pipe vented, pressure is developed in the brake pipe 4. Irrespective of what happens in the AB brake valve the immediate effect in the variable load mechanism would be a rise of pressure above atmospheric pressure in the valve chamber 95 of the cutoff valve. The slide valve 96 would remain in its lowermost position as shown in Figure 1 because the spring 102 (even with the diaphragm 104 unloaded) has sufficient strength to oppose a pressure of say 15 lbs. per square inch acting upward on diaphragm 99.

Consequently passage 75 would be exposed and pressure would develop to the left of feeler piston 69 and above latch piston 85. When the pressure is sufficient to overcome spring 71, the piston will start outward and ultimately will reach a position fixed by collision of lever 63 and lug 65. Before this position is reached the side port 81 will be exposed and the latch 83 will have been released by piston 85. Release of the latch permits the piston 77 to move to the right, but ultimately the flow of pressure fluid through passage 82 would cause it to move back to the left until the end of rod 79 was arrested by collision with the upper end of lever 66. Since the piston 69 is larger and hence dominant, the bell crank lever and the fulcrum roller 34 would be positioned according to the position of lug 65 on bolster 2.

Before a brake releasing pressure is reached in the pipe 4 and say at 35 lbs. per square inch, the diaphragm 99 and connected valve 96 will move upward far enough to connect passage 75 with release port 97. At that time the pressure in the space above diaphragm 104, which had risen with pressure in passage 75, will be vented so that the stress on spring 102 will be partially relieved and a condition will be established under which valve 96 will remain in its uppermost position through all service reductions of brake pipe pressure.

The venting of passage 75 entails immediate venting of the space above latch piston 85, so that the latch re-engages, after which the cylinder 72 and finally the cylinder 76 are vented. The piston 77 cannot retreat because it is latched, but the piston 69 does retreat, permitting the spring 68 to restore the feeler mechanism to the position shown in Figure 1 so that lever 63 is moved out of the path of lug 65.

On an unloaded car the fulcrum 34 would be directly below the thrust member 31 so that the relay is inoperative and no pressure can be developed in the load cylinder 17. On a loaded car the relay is operative. At the start of a service application pressure developed in the light brake cylinder 14 is also developed in the space 41. At 8 lbs. it closes the exhaust valve 54 and at 13 lbs. it opens the valve 56, thus subjecting the relay diaphragm 26 to the pressure in the light brake cylinder 14 diminished by the 13 lbs. interval. The relay then functions through the displacement of diaphragm 27 to admit pressure fluid from supplemental reservoir 12 to chamber 42 and thence to the load brake cylinder 17. The piston of the load brake cylinder is clutched to the brake rigging as already described upon very slight initial motion of its piston. From then on the two cylinders operate in concert, the pressure in the load cylinder 17 being less than that in the light cylinder 14 by an amount which diminishes as the intensity of application is increased, the pressure difference approaching zero at full service application.

If the retainer 16 is not set when the brakes are released, the space 43 will be vented either past the exhaust valve 54 or past the ball check valve 51, while releasing flow from the load cylinder 17 will occur past the release valve 36. However, if the retainer 16 is set, the chamber 43 can be vented only at the rate determined by the retainer and to the minimum value fixed by the retainer. This is high enough to prevent the relay from moving to a position in which the release valve 36 will completely discharge the cylinder 17. The effect of the retainer, therefore, is to prevent complete release of air from the load brake cylinder 17, so that in grade cycling both cylinders 14 and 17 are controlled in the same manner and the waste of air which has heretofore been encountered through complete release of the load brake cylinder is avoided. It will be observed that in releasing operations with the retainer set the check valve 51 allows the pressure in chamber 43 to fall as pressure in cylinder 14 falls.

In the above description the effort has been to disclose the best known embodiment of the invention and for that reason inventions made by others than the present applicant have been included. Characteristic features of the present invention can, however, be availed of by the use of other and approximately equivalent mechanisms which could take the place of the feeler mechanism and the ratio adjusting linkage above described in detail. Other changes within the broad scope of the invention are possible. Consequently the detailed disclosure should be regarded as illustrative and not limiting, the scope of the invention being defined solely by the claims.

What is claimed is:

1. In a variable load brake, the combination with a vehicle having a truck including suspension springs, of a relay for modifying the intensity of brake applications; ratio controlling means adjustable to vary the setting of said relay progressively between a no load and a full load setting; a motor for shifting said ratio controlling means in one direction; stop means for limiting the shift of the ratio controlling means by said motor; sensing means on the truck responsive to load deflection of the suspension springs; and a Bowden wire operatively connecting said sensing means with said stop.

2. A variable load brake mechanism comprising a light brake cylinder; a load brake cylinder; a retainer for limiting the release flow from the light brake cylinder; a relay responsive to pressure in the light brake cylinder and operative to admit air to and exhaust it from the load brake cylinder; a pilot valve controlling the pressure connection between the light brake cylinder and the relay and normally serving to cause the load cylinder to start to apply after and to fully release before the light cylinder starts to apply and fully release, respectively; and means associated with the pilot valve for subjecting the final releasing action of the relay to control by the retainer.

3. A variable load brake mechanism comprising a light brake cylinder; a load brake cylinder; a retainer for limiting the release flow from the light brake cylinder; a pressure controlled relay adapted to operate in response to braking pressure in the light brake cylinder and serving to admit air to and exhaust it from the load brake cylinder; a pilot valve adapted to delay the initial development of controlling pressure on the relay at the start of application and to vent said pressure and so release the load cylinder when the light cylinder braking pressure reaches a low value but prior to full release thereof; and connections whereby said venting action is subjected to control by the retainer.

4. A variable load brake mechanism comprising a light brake cylinder; a load brake cylinder; a pressure controlled relay adapted to operate in response to braking pressure in the light brake cylinder and serving to admit air to and exhaust it from the load brake cylinder; a pilot valve adapted to delay the initial development of controlling pressure on the relay at the start of application and to vent said pressure and so release the load cylinder when the light cylinder pressure reaches a low value but prior to full release thereof; and a retainer serving to control releasing flow from the light brake cylinder, and to inhibit release of said load cylinder which would otherwise occur when pressure in the light cylinder reaches said low value.

5. A variable load brake mechanism comprising a light brake cylinder; a load brake cylinder; a retainer for limiting the release flow from the light brake cylinder; a pressure controlled relay adapted to operate in response to braking pressure in the light brake cylinder and serving to admit air to and exhaust it from the load brake cylinder; a pilot valve controllable by a pressure differential between the two brake cylinders, and serving to connect the light cylinder in controlling relation with the relay when pressure in the former reaches a chosen value, and disconnect the same and vent the relay when light cylinder pressure falls to a chosen value; and connections whereby the retainer when active limits the venting action of the pilot valve.

6. In a variable-load brake, the combination of a relay for modifying the intensity of brake applications; ratio controlling means adjustable to vary the setting of said relay progressively between no-load and full-load settings; normally retracted load-sensing means; a movable stop positioned by motion of the load-sensing means; a first motor serving when energized to move said load-sensing means to its load-sensing position and thus position said stop according to the sensed load; means biasing said ratio-controlling means toward its no-load setting; a second motor serving when energized to move said ratio adjusting means in opposition to said bias to settings determined by said stop; and controlling means for energizing said motors sequentially in such order that the first motor is energized and moves the load-sensing means to sense the load and set the stop while the biasing means moves the ratio-adjusting means and the second motor toward no-load setting, and then both motors are energized whereby the second motor moves the ratio adjusting means to a setting determined by the position of said stop.

7. In a variable load brake, the combination of a relay for modifying the intensity of brake applications; ratio-controlling means adjustable to vary the setting of said relay between a no-load setting and a series of load settings; normally retracted load sensing means; relay-adjusting motor means adapted to be controlled according to the load-sensing positions assumed by said load-sensing means when projected; normally restrained yielding means serving to bias said adjusting means toward said no-load setting; and control means serving periodically to project the load-sensing means and free the biasing means, and while the load-sensing means is so projected and after a time interval in which said biasing means is free to act, serving to energize the relay-adjusting motor means and cause it to effect an adjustment in opposition to said biasing means.

8. In a variable-load air brake, the combination of a brake-controlling valve device; ratio-controlling means associated therewith, and having a series of settings in which it serves to establish a series of braking ratios appropriate for loads from no-load to full-load; means biasing the ratio-controlling means toward its no-load setting; a latch normally effective to hold said ratio-controlling means in its adjusted positions; a first pneumatic motor for disengaging said latch; a normally retracted load-sensing means including a stop for arresting the ratio controlling means, and positioned according to the sensed load when the sensing means is projected; a second pneumatic motor for projecting said load sensing means to its load-sensing positions; a third pneumatic motor for shifting said ratio-controlling means against the urge of said biasing means until arrested by said stop; and a controller operable periodically to supply motive air to the first, second and third motors in the order stated, then vent the first motor and thereafter the other two.

HENRY NORTON SUDDUTH.

REFERENCES CITED

The following references are of record in the file of this patent:

UNITED STATES PATENTS

| Number | Name | Date |
|---|---|---|
| 1,650,309 | Whitaker | Nov. 22, 1927 |
| 2,418,013 | Cook | Mar. 25, 1947 |